US012172439B2

(12) United States Patent
Kakiuchi et al.

(10) Patent No.: US 12,172,439 B2
(45) Date of Patent: Dec. 24, 2024

(54) LIQUID DROPLET DISCHARGING HEAD

(71) Applicant: Brother Kogyo Kabushiki Kaisha, Nagoya (JP)

(72) Inventors: Toru Kakiuchi, Chita-gun (JP); Taisuke Mizuno, Yokkaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 631 days.

(21) Appl. No.: 17/330,858

(22) Filed: May 26, 2021

(65) Prior Publication Data

US 2021/0370672 A1 Dec. 2, 2021

(30) Foreign Application Priority Data

May 28, 2020 (JP) ................................ 2020-093107

(51) Int. Cl.
*B41J 2/14* (2006.01)
*B41J 2/045* (2006.01)

(52) U.S. Cl.
CPC ............ *B41J 2/1404* (2013.01); *B41J 2/045* (2013.01); *B41J 2/14233* (2013.01); *B41J 2/1433* (2013.01); *B41J 2202/11* (2013.01)

(58) Field of Classification Search
CPC ...... B41J 2/1404; B41J 2/045; B41J 2/14233; B41J 2/1433; B41J 2202/11; B41J 2002/14491
See application file for complete search history.

(56) References Cited

U.S. PATENT DOCUMENTS

| | | | | |
|---|---|---|---|---|
| 7,111,928 | B2 * | 9/2006 | Satake | B41J 2/14233 347/71 |
| 2006/0244772 | A1 | 11/2006 | Sekiguchi et al. | |
| 2008/0018714 | A1 | 1/2008 | Domoto et al. | |
| 2009/0219313 | A1 * | 9/2009 | Suzuki | B41J 29/38 347/54 |
| 2009/0244200 | A1 * | 10/2009 | Ozawa | B41J 2/14201 347/68 |

(Continued)

FOREIGN PATENT DOCUMENTS

| | | |
|---|---|---|
| JP | 2007-144886 A | 6/2007 |
| JP | 2007-190901 A | 8/2007 |

(Continued)

OTHER PUBLICATIONS

Mar. 19, 2024—(JP) Notice of Reasons for Refusal—App 2020-093107.

*Primary Examiner* — Thinh H Nguyen
(74) *Attorney, Agent, or Firm* — Banner & Witcoff, Ltd.

(57) ABSTRACT

A liquid droplet discharging head includes a channel unit having nozzles and pressure chambers in respective communication with the nozzles, and a piezoelectric element having a vibration plate arranged on an upper surface of the channel unit to cover the pressure chambers and a piezoelectric layer arranged on an upper surface of the vibration plate. The pressure chambers have a length L longer than its width, and the channel unit has the nozzles and the pressure chambers aligned at a density of 300 dpi or higher in a conveyance direction. The length L of the pressure chambers and the diameter D of nozzle holes of the nozzles satisfy this relation or condition: $35 \leq L/D \leq 50$.

7 Claims, 9 Drawing Sheets

(56) References Cited

U.S. PATENT DOCUMENTS

| | | | | |
|---|---|---|---|---|
| 2009/0273654 | A1 * | 11/2009 | Kazama | H10N 30/85 310/311 |
| 2011/0007108 | A1 | 1/2011 | Ozawa et al. | |
| 2013/0135396 | A1 | 5/2013 | Lee et al. | |
| 2013/0278679 | A1 | 10/2013 | Takeuchi et al. | |
| 2019/0283424 | A1 * | 9/2019 | Mcavoy | B41J 2/1628 |
| 2020/0047496 | A1 | 2/2020 | Kakiuchi et al. | |

FOREIGN PATENT DOCUMENTS

| | | | |
|---|---|---|---|
| JP | 2011-037257 | A | 2/2011 |
| JP | 2013-220614 | A | 10/2013 |
| JP | 2020-026037 | A | 2/2020 |
| KR | 10-1275471 | | 6/2013 |

* cited by examiner

LIQUID DROPLET DISCHARGING HEAD

CROSS REFERENCE TO RELATED APPLICATION

The present application claims priority from Japanese Patent Application No. 2020-093107, filed on May 28, 2020, the disclosure of which is incorporated herein by reference in its entirety.

BACKGROUND

Field of the Invention

The present invention relates to a liquid droplet discharging head which discharges liquid droplets from nozzles.

Description of the Related Art

Japanese Patent Application Laid-open No. 2007-144886 discloses a liquid droplet discharging head discharging ink from nozzles. In the liquid droplet discharging head of Japanese Patent Application Laid-open No. 2007-144886, a plurality of nozzles is aligned in one row at a spatial density of 180 dpi, and a length of each of pressure chambers is set to 1,000 μm to 1,500 μm. By configuring the liquid droplet discharging head in this manner, it is possible to drive the liquid droplet discharging head at a high frequency while allowing for both a high speed printing and a high image quality.

SUMMARY

In this context, for the liquid droplet discharging head, from the point of view of downsizing, it is requested to further downsize the pressure chambers. However, with the liquid droplet discharging head disclosed in Japanese Patent Application Laid-open No. 2007-144886, if the pressure chambers are further downsized and driven at the high frequency, discharging the liquid droplets from the nozzles are liable to become unstable.

For example, the present inventors downsized the pressure chambers whose planar shape is rectangular such that its long side was 580 μm in length and its short side was 65 μm in length, where the nozzles were aligned in one row at the density of 300 dpi. As a result of carrying out a test of discharging the liquid droplets from the nozzles, the present inventors found out the following problem. The result of the discharging test is depicted in FIG. 8, where the vertical axis indicates a ratio of the forgoing liquid droplet amount to the total amount of liquid droplets discharged from the nozzles whereas the horizontal axis indicates discharging speed of liquid droplets from the nozzles. According to the ratio of the amount of foregoing liquid droplets indicated by the vertical axis of FIG. 8, if the discharging speed of the liquid droplets from the nozzles is 6 m/s or faster, then it is observable that the liquid droplets divide or diffuse themselves, i.e., foregoing liquid droplets are generated. As the discharging speed of liquid droplets increases, the ratio of the amount of those foregoing liquid droplets decreases. If the foregoing liquid droplets become as small droplets as the ratio of liquid droplet amount being lower than 50%, then they are more likely to be affected by air flow. As a result, not only a desired liquid droplet amount can no longer be obtained, but also such a problem will arise that the foregoing liquid droplets are more likely to disorder their landing positions.

Accordingly, an object of the present teaching is to provide a liquid droplet discharging head capable of securing the foregoing liquid droplets with the ratio of liquid droplet amount at 50% or higher, and restraining the foregoing liquid droplets from disordering the landing position.

According to an aspect of the present teaching, there is provided a liquid droplet discharging head including:

a channel unit having a plurality of nozzles arranged in an end thereof on one side in a first direction, and a plurality of pressure chambers arranged in another end thereof on the other side in the first direction and communicating with the nozzles respectively; and a piezoelectric element having a vibration plate arranged on a surface of the channel unit on the other side in the first direction to cover the pressure chambers, and a piezoelectric layer arranged on a surface of the vibration plate on the other side in the first direction, wherein each of the pressure chambers has a length L in a second direction longer than a length in a third direction, the second direction being orthogonal to the first direction and being a direction from an inflow area where liquid flows into one of the pressure chambers to one of the nozzles communicating with the pressure chamber, the third direction being orthogonal to both the first direction and the second direction, wherein in the channel unit, the nozzles are aligned at a density of 300 dpi or higher in the third direction, and the pressure chambers are aligned at the density of 300 dpi or higher in the third direction, wherein each of the nozzles has a nozzle hole opening in the surface of the channel unit on the one side, and wherein the length L of each of the pressure chambers and a diameter D of the nozzle hole satisfy $35 \leq L/D \leq 50$.

According to the liquid droplet discharging head of the present teaching, when liquid droplets are discharged from the nozzle holes, the ratio of an amount of foregoing liquid droplets discharged earlier increases to as much as 50% or more. Therefore, the foregoing liquid droplets are less likely to disorder their landing positions. Further, for example, by carrying out a publicly known discharging control to suppress discharging the succeeding liquid droplets which will be discharged following the foregoing liquid droplets, it is possible to discharge the foregoing liquid droplets only.

DESCRIPTION OF THE EMBODIMENT

Hereinbelow, an embodiment of the present teaching will be explained.

Configuration of Printer 1

Figure 1:
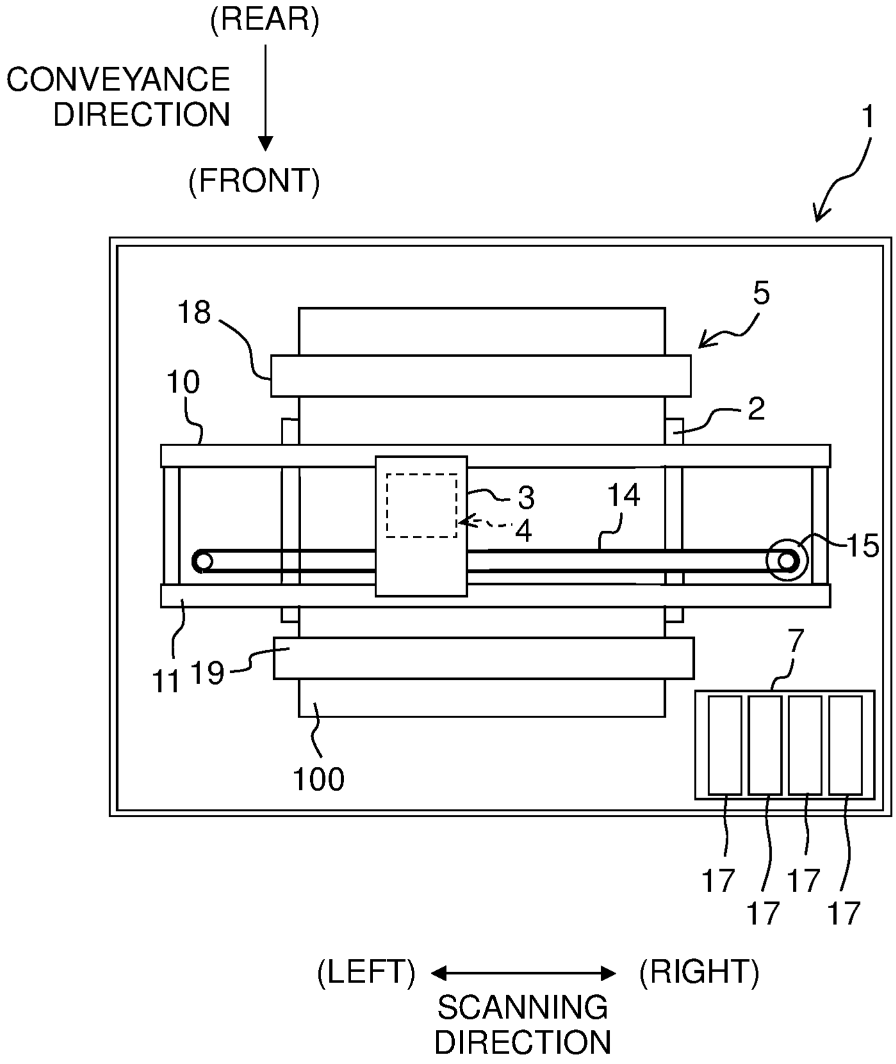
FIG. 1 is a schematic configuration diagram of a printer including an ink jet head according to an embodiment of the present teaching.

As depicted in FIG. 1, a printer 1 according to this embodiment includes a carriage 3, an ink jet head 4 (the "liquid droplet discharging head" of the present teaching), and a conveyance mechanism 5.

The carriage 3 is fitted with two guide rails 10 and 11 extending in a horizontal scanning direction (the "second direction" of the present teaching). Further, the carriage 3 is linked with a carriage drive motor 15 via an endless belt 14. The carriage 3 is driven by the carriage drive motor 15 to reciprocate in the scanning direction over recording paper 100 on a platen 2. Note that in the following explanation, as depicted in FIGS. 1 to 6, the right side and the left side are defined according to the scanning direction.

The ink jet head 4 is mounted on the carriage 3. The ink jet head 4 is provided respectively with inks through unshown tubes from ink cartridges 17 placed in a holder 7, the inks being in four colors (black, yellow, cyan, and magenta). The ink jet head 4 moves in the scanning direction with the carriage 3 while discharging the inks toward the recording paper 100 on the platen 2 from a plurality of nozzles 24 (see FIGS. 2 to 6).

The conveyance mechanism 5 conveys the recording paper 100 on the platen 2 with a pair of rollers 18 and 19 in a conveyance direction being horizontal and orthogonal to the scanning direction (the "third direction" of the present teaching). Further, in the following explanation, as depicted in FIGS. 1 to 4 and FIG. 6, the front side and the rear side are defined according to the conveyance direction.

Ink Jet Head 4

Figure 2:
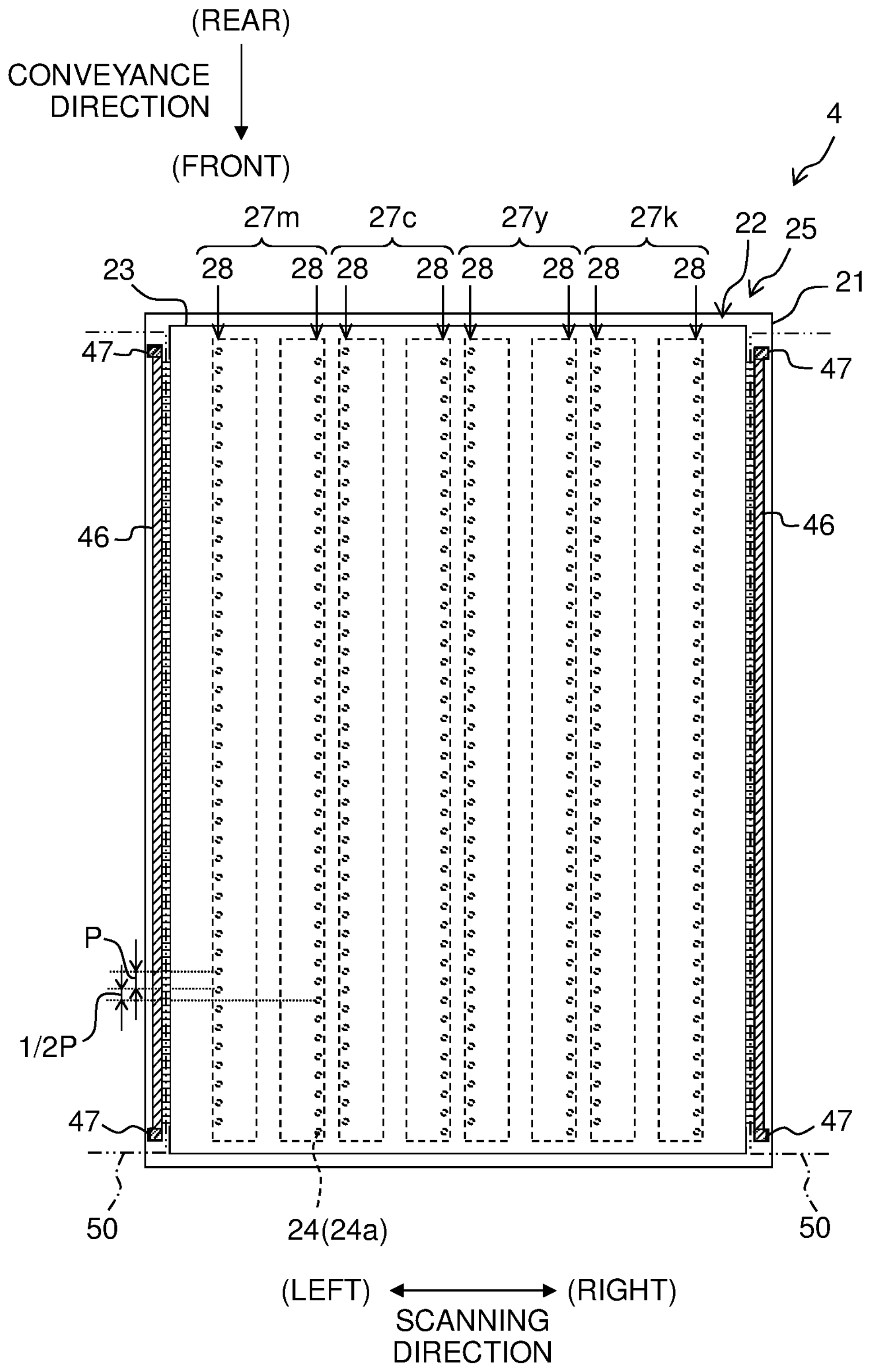
FIG. 2 is a plan view of the ink jet head of FIG. 1.
Figure 3:
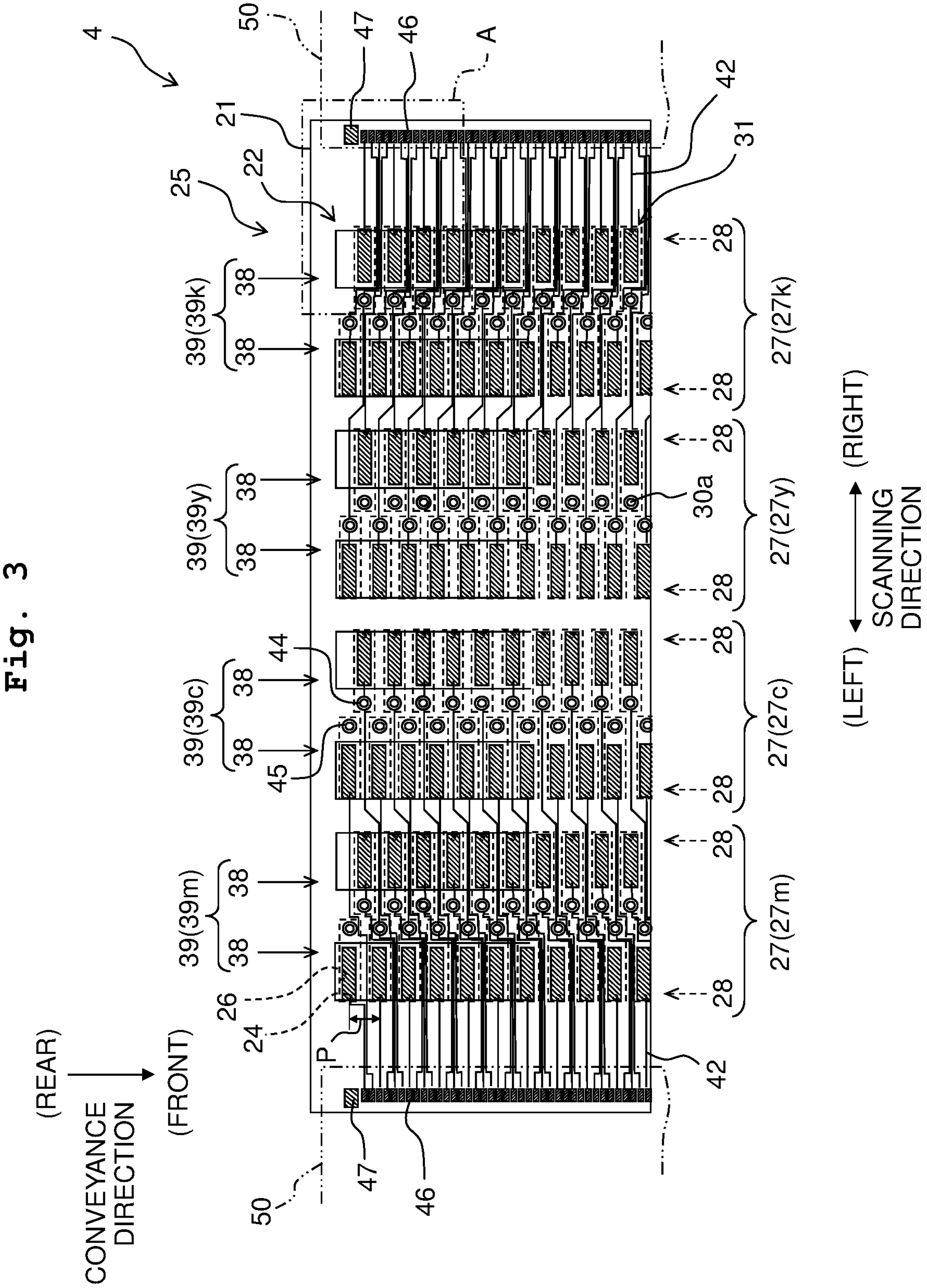
FIG. 3 is an enlarged view of a rear end of the ink jet head of FIG. 2.
Figure 4:
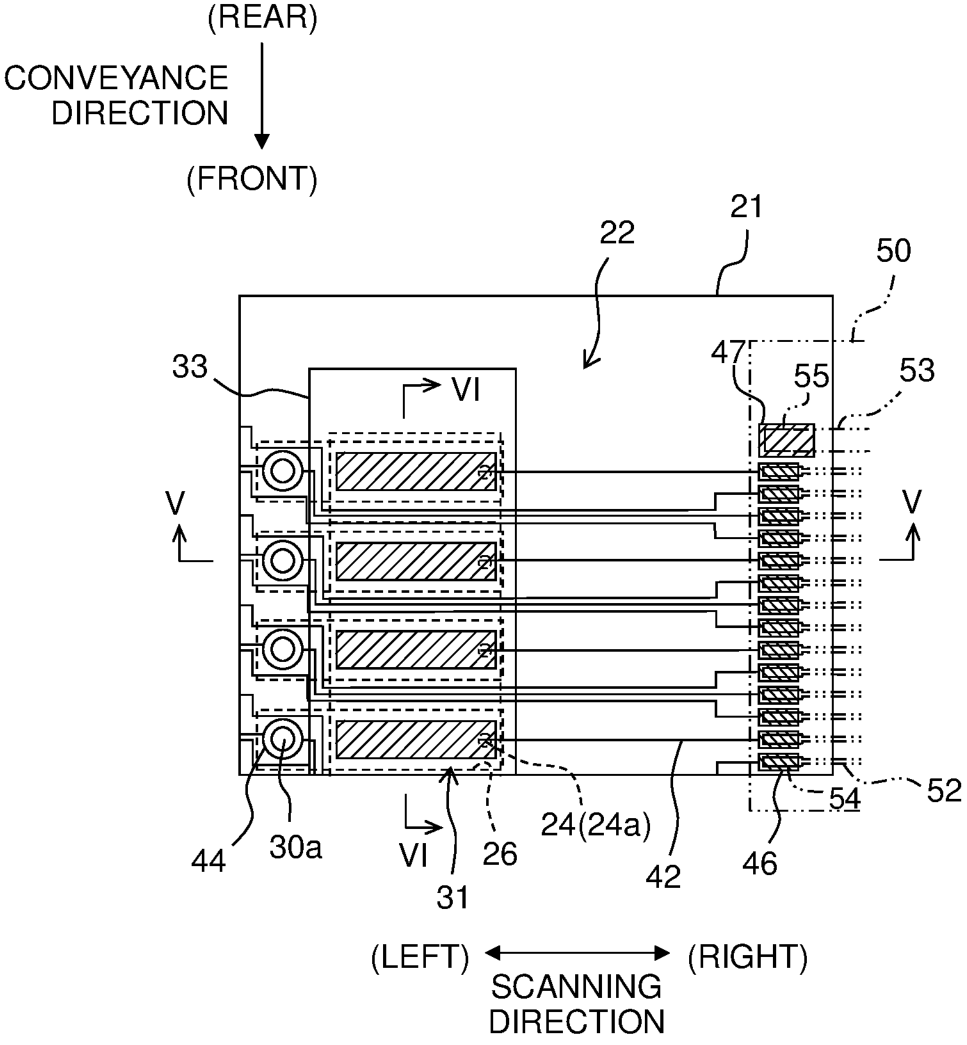
FIG. 4 is an enlarged view of part A of FIG. 3.

Next, referring to FIGS. 2 to 6, a configuration of the ink jet head 4 will be explained in detail. Note that in FIGS. 3 and 4, illustration of a protection member 23 depicted in FIG. 2 is omitted.

The ink jet head 4 of this embodiment is configured to discharge the inks of the four colors (black, yellow, cyan, and magenta). As depicted in FIGS. 2 to 6, the ink jet head 4 includes an actuator device 25 comprised of a nozzle plate 20, a channel member 21, and a piezoelectric actuator 22. Note that in this embodiment, the combination of the nozzle plate 20 and the channel member 21 corresponds to the "channel unit" of the present teaching.

Nozzle Plate 20

The nozzle plate 20 is formed of silicon whose thickness is about not less than 30 μm and not more than 60 μm. The nozzle plate 20 is formed therein with the plurality of nozzles 24 arrayed in the conveyance direction. By virtue of this, in this embodiment, the plurality of nozzles 24 are arranged at the lower end of the channel unit (the "end at one side" of the present teaching), according to an up/down direction (the "first direction" of the present teaching).

To explain the arrangement of the plurality of nozzles 24 in more detail, as depicted in FIGS. 2 and 3, the nozzle plate 20 is formed with four nozzle groups 27 aligning in the scanning direction. The four nozzle groups 27 discharge the inks of different colors from each other. One nozzle group 27 is formed from two nozzle arrays 28 from left to right. In each nozzle array 28, a plurality of nozzles 24 are arrayed at a arrayal pitch P whose spatial density is 300 dpi or higher. That is, in each nozzle array 28, the plurality of nozzles 24 are arrayed in one array at an interval corresponding to 300 dpi. Further, between two nozzle arrays 28 in each nozzle group 27, the nozzles 24 deviate in position in the conveyance direction by P/2. That is, the plurality of nozzles 24 constituting one nozzle group 27 are arrayed to form two arrays in a zigzag fashion. In this embodiment, the nozzles 24 constituting a nozzle group 27 of one color are arrayed at the density of 600 dpi or higher.

Figure 5:
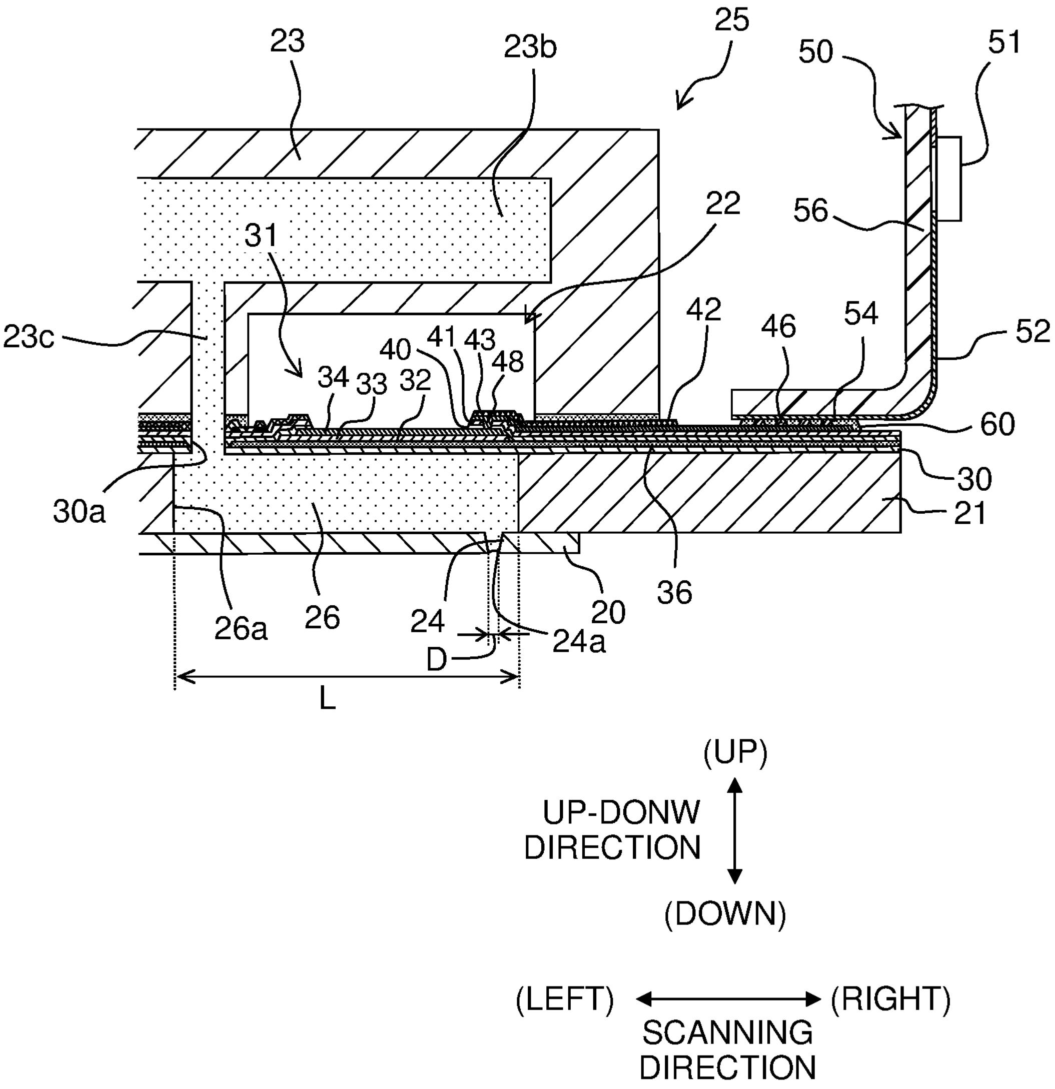
FIG. 5 is a cross sectional view along a line V-V of FIG. 4.
Figure 6:
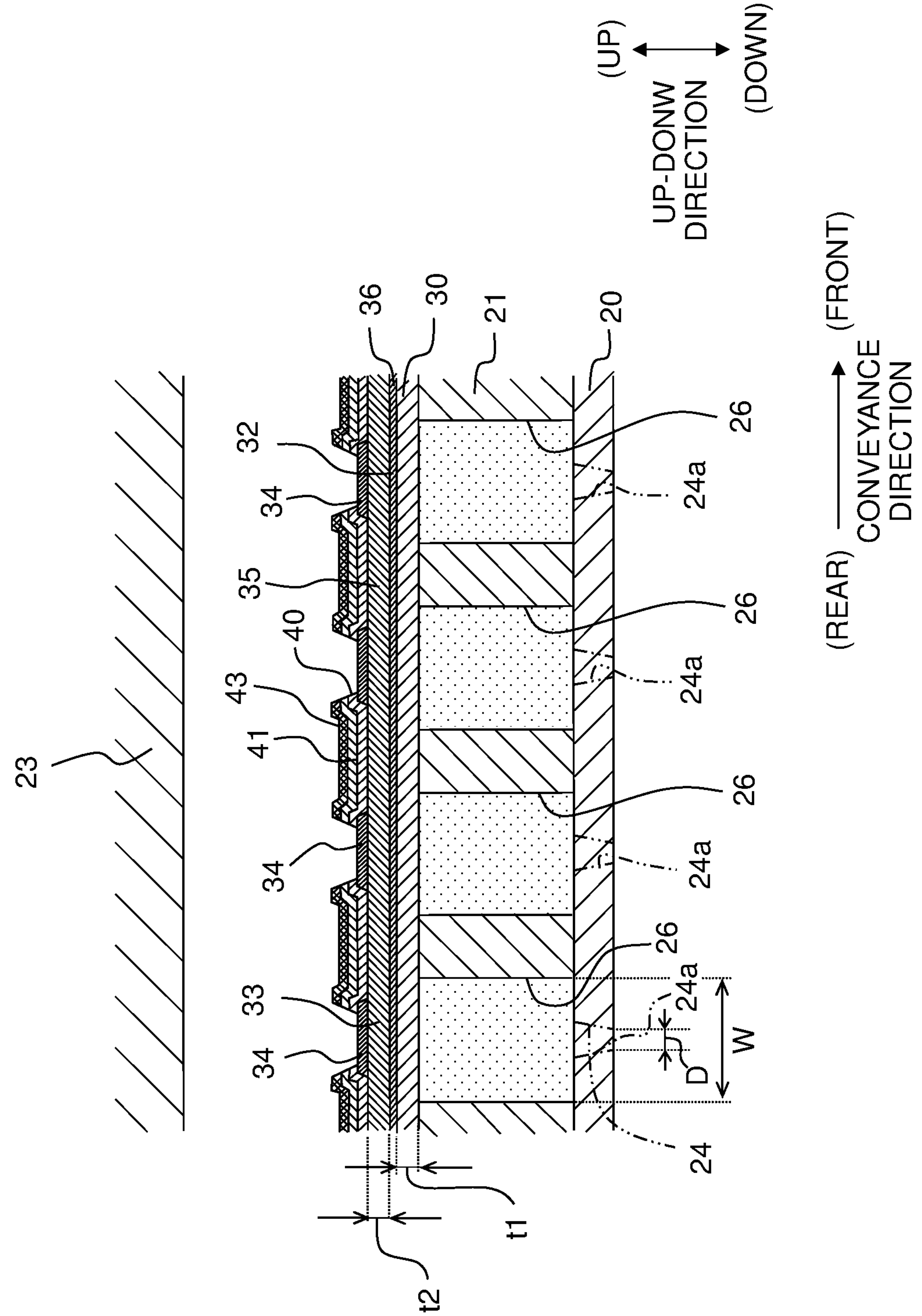
FIG. 6 is a cross sectional view along a line VI-VI of FIG. 4.

Further, as depicted in FIGS. 5 and 6, each nozzle 24 is formed in a tapering shape whose diameter increases along the upward direction, and has a nozzle hole **24*a* opening in the lower surface of the nozzle plate 20 (the "surface of the channel unit on one side" of the present teaching). The diameter D of the nozzle hole 24*a* in this embodiment is preferably 12 μm or larger. Further, if the nozzle 24** is formed in a tapering or stepping shape, then the diameter D refers to the emitting diameter at which the ink is emitted.

Note that in the following explanation, in the components of the ink jet head 4, following a numeric number indicating each component, an alphabetic letter is assigned as appropriate such as "k" for black, "y" for yellow, "c" for cyan, and "m" for magenta, to present which ink the component corresponds to, with respect to those components corresponding respectively to the inks of black, yellow, cyan, and magenta. For example, the nozzle group **27*k* refers to the nozzle group 27** discharging the black ink.

Channel Member 21

The channel member 21 is a substrate of silicon single crystal whose thickness is about not less than 50 μm and not more than 150 μm. As depicted in FIGS. 2 to 6, the channel member 21 is formed therein with a plurality of pressure chambers 26 in respective communication with the plurality of nozzles 24. In the channel unit constructed from the nozzle plate 20 and the channel member 21, ink channels (the "liquid channel" of the present teaching) are formed from the plurality of nozzles 24 and the plurality of pressure chambers 26.

Each pressure chamber 26 has a planar shape of rectangle elongated in the scanning direction. The plurality of pressure chambers 26 are arrayed in the conveyance direction at the same arrayal pitch P (the density of 300 dpi or higher) as the aforementioned arrays of the plurality of nozzles 24, forming eight pressure chamber arrays in total with two pressure chamber arrays for one color ink. That is, in each pressure chamber array, the plurality of pressure chambers 26 are arrayed in one array at the interval corresponding to 300 dpi. The lower surface of the channel member 21 is covered by the nozzle plate 20. Further, one end of each pressure chamber 26 overlaps with a nozzle 24 in the scanning direction. Then, by virtue of this, the plurality of pressure chambers 26 are arranged in the upper part of the channel unit (the "other side in the first direction" of the present teaching) in this embodiment.

Note that on the upper surface of the channel member 21 (the "surface of the channel unit on the other side in the first direction" of the present teaching), as depicted in FIG. 5, a vibration plate 30, one component of the aforementioned piezoelectric actuator 22, is arranged to cover the plurality of pressure chambers 26. The vibration plate 30 is an isolative film covering the pressure chambers 26 and is not limited to other particular aspects. For example, in this embodiment, the vibration plate 30 is a film formed by oxidizing or nitriding the surface of a silicon substrate. The vibration plate 30 is formed with an ink supply hole 30*a* in the part covering the other end of each pressure chamber 26 in the scanning direction (the end at the opposite side to the nozzle 24). That is, the other end of each pressure chamber 26 in the scanning direction is an inflow area 26*a* where the ink flows into the pressure chamber 26 via the ink supply hole 30*a*. The scanning direction is parallel to the horizontal direction and parallel to the direction from the inflow area 26*a* toward the nozzle 24. As depicted in FIG. 5, in the scanning direction, the inflow area 26*a* in this embodiment is the area from the position closest to the nozzle 24 to the edge farthest away from the nozzle 24 of the pressure chamber 26, in the area of the pressure chamber 26 overlapping with the ink supply hole 30*a*.

Further, as depicted in FIG. 5, the length L of the pressure chamber 26 in the scanning direction is parallel to the scanning direction and preferably not less than 420 μm and not more than 900 μm. Further, as depicted in FIG. 6, the width W of the pressure chambers 26 (the length in the conveyance direction) is about 65 μm and preferably not more than 80 μm. Further, the thickness t1 of the vibration plate 30 is about 1.4 μm in this embodiment and preferably not less than 1 μm and not more than 3 μm.

Actuator Device 25

The actuator device 25 is arranged on the upper surface of the channel member 21. The actuator device 25 has the piezoelectric actuator 22 including a plurality of piezoelectric elements 31, the protection member 23, and two COFs 50.

The piezoelectric actuator 22 is arranged on the entire area of the upper surface of the channel member 21. As depicted in FIGS. 3 and 4, the piezoelectric actuator 22 has the plurality of piezoelectric elements 31 arranged to overlap respectively with the plurality of pressure chambers 26. The plurality of piezoelectric elements 31 are arrayed in the conveyance direction along the arrays of the pressure chambers 26 to form eight piezoelectric element arrays 38. From each piezoelectric element array 38, a plurality of drive contact points 46 and two ground contact points 47 are drawn out and, as depicted in FIGS. 2 and 3, the contact points 46 and 47 are arranged at the left and right ends of the channel member 21.

The protection member 23 is arranged on the upper surface of the piezoelectric actuator 22 to cover the plurality of piezoelectric elements 31. Further, the protection member 23 has four reservoirs 23*b* connected with the four ink cartridges 17 in the holder 7. The ink in each reservoir 23*b* is supplied to each pressure chamber 26 (each inflow area 26*a*) from the ink supply hole 30*a* formed in the vibration plate 30 via a throttle channel 23*c*.

The COF 50 depicted in FIGS. 2 to 5 has a substrate 56 on which a driver IC 51 is mounted. One end of each of the two COFs 50 is connected to a controller (not depicted) of the printer 1 whereas the other ends of the two are joined respectively to the left and right ends of the piezoelectric actuator 22. As depicted in FIG. 4, the COF 50 has a plurality of individual wires 52 connected to the driver IC 51, and a ground wire 53. The individual wires 52 are connected with the drive contact points 46 via individual contact points 54 while the ground wire 53 is connected with a ground contact point 47 via a ground connecting contact point 55. The driver IC 51 outputs a drive signal to each of the plurality of piezoelectric elements 31 of the piezoelectric actuator 22 via the individual contact points 54 and the drive contact points 46.

Piezoelectric Actuator 22

Next, the piezoelectric actuator 22 will be explained in detail. As depicted in FIGS. 2 to 6, the piezoelectric actuator 22 has the aforementioned vibration plate 30, a common electrode 36, a piezoelectric layer 33, and a plurality of second electrodes 34. Note that in order to simplify the drawings, FIGS. 3 and 4 omit illustration of a protection film 40, an isolation film 41 and a wire protection film 43 which are depicted in the cross sectional views of FIGS. 5 and 6.

As depicted in FIGS. 5 and 6, the common electrode 36 has a plurality of first electrodes 32 formed in an area on the upper surface of the vibration plate 30 to face the plurality of pressure chambers 26, and an electric conduction unit 35 linking the plurality of first electrodes 32. Further, the common electrode 36 covers almost the entire area of the upper surface of the vibration plate 30. The common electrode 36 is formed of, for example, platinum (Pt) whose thickness is 0.1 μm.

The piezoelectric layer 33 is formed of, for example, a piezoelectric material such as Lead Zirconate Titanate (PZT). Alternatively, the piezoelectric layer 33 may be formed of a non-leaded piezoelectric material without containing lead. The thickness t2 of the piezoelectric layer 33 is preferably not less than 1.0 μm and not more than 1.5 μm and, in this embodiment, the thickness t2 is 1.0 μm.

As depicted in FIGS. 3, 4 and 6, the piezoelectric layer 33 is arranged on the upper surface of the vibration plate 30 where the common electrode 36 is formed. The piezoelectric layer 33 is provided according to each pressure chamber array to extend in the conveyance direction across the plurality of pressure chambers 26 forming the pressure chamber arrays.

The second electrodes 34 are arranged on the upper surface of the piezoelectric layer 33. Each of the second electrodes 34 has a planar shape of rectangle being one size smaller than the pressure chamber 26, overlapping in the up/down direction with a central portion of the pressure chamber 26. The plurality of second electrodes 34 are individual electrodes provided individually according to each pressure chamber 26. The second electrodes 34 are formed of, for example, iridium (Ir) or platinum (Pt), its thickness being 0.1 μm. Further, the part of the piezoelectric layer 33 interposed between the first electrode 32 and the second electrode 34 is polarized.

In the piezoelectric actuator 22 of this kind, each piezoelectric element 31 is formed from the combination of the part overlapping in the up/down direction with the vibration plate 30 and the pressure chamber 26 of the piezoelectric layer 33, and the first electrode 32 and the second electrode 34 overlapping in the up/down direction with that part of the piezoelectric layer 33. That is, the plurality of piezoelectric elements 31 are arrayed in the conveyance direction according to the arrays of the plurality of pressure chambers 26. By virtue of this, the plurality of piezoelectric elements 31 form eight piezoelectric element arrays 38 in total, every two of which correspond to one color ink. Note that a piezoelectric element group 39 will be used to refer to a set of piezoelectric elements 31 formed from two piezoelectric element arrays 38 corresponding to one color ink. As depicted in FIG. 3, four piezoelectric element groups 39*k*, 39*y*, 39*c* and

39*m* are aligned in the scanning direction to correspond respectively to the four color inks.

As depicted in FIGS. 5 and 6, the piezoelectric actuator 22 further has the protection film 40, the isolation film 41, wires 42, and the wire protection film 43. The protection film 40 is arranged to cover the surface of the piezoelectric layer 33 except the area where the central portions of the second electrodes 34 are arranged. The isolation film 41 is formed on the protection film 40. The isolation film 41 is provided for raising the isolation quality between the common electrode 36 and the aftermentioned wires 42 connected to the second electrodes 34.

On the isolation film 41, the plurality of wires 42 are formed which are drawn out of the second electrodes 34 of the plurality of piezoelectric elements 31, respectively. One end of each wire 42 is in conduction with a second electrode 34 due to a penetrating conduction unit 48 penetrating the protection film 40 and the isolation film 41. As depicted in FIG. 3, in the four piezoelectric element groups 39, from the piezoelectric elements 31 forming the right two piezoelectric element groups 39*k* and 39*y*, the wires 42 extend rightward, whereas from the piezoelectric elements 31 forming the left two piezoelectric element groups 39*c* and 39*m*, the wires 42 extend leftward.

The drive contact points 46 are provided at the other ends of the wires 42. The plurality of drive contact points 46 are aligned in one array in the conveyance direction at each left end and right end of the piezoelectric actuator 22. Further, the two ground contact points 47 are arranged respectively at the two sides in the arrayal direction for the plurality of drive contact points 46 aligning in one array in a front/rear direction. The ground contact points 47 are connected with the common electrode 36 via unshown conductive portions penetrating the protection film 40 and the isolation film 41 right below the ground contact points 47.

The drive contact points 46 and the ground contact points 47 are exposed from the protection member 23. Each drive contact point 46 is connected with the driver IC 51 via the individual contact point 54 and the individual wire 52 of the COF 50 such that the drive signal is supplied to the drive contact point 46 from the driver IC 51. By virtue of this, either the ground potential or a predetermined potential (about 20V for example) is selectively applied to each second electrode 34 individually. The ground potential is applied to each ground contact point 47 by way of being connected with the ground connecting contact point 55 of the COF 50.

As depicted in FIG. 5, the wire protection film 43 is arranged to cover the plurality of wires 42. Note that as depicted in FIGS. 5 and 6, in this embodiment, the second electrodes 34 are exposed from the protection film 40, the isolation film 41 and the wire protection film 43 except their peripheral parts. That is, the protection film 40, the isolation film 41 and the wire protection film 43 construct a structure where the piezoelectric layer 33 is less likely to be hindered from deformation.

Method for Driving the Piezoelectric Actuator 22

In this context, an explanation will be given on a method for discharging the inks from the nozzles 24 by driving the piezoelectric actuator 22 (the piezoelectric elements 31). In the piezoelectric actuator 22, the second electrodes 34 of all piezoelectric elements 31 are maintained at the drive potential beforehand. Under this condition, due to the potential difference between the first electrodes 32 and the second electrodes 34, an electrical field arises in the piezoelectric layer 33 along the thickness direction to cause the piezoelectric layer 33 to contract in a direction orthogonal to the thickness direction. As a result, the parts of the vibration plate 30 and the piezoelectric layer 33 overlapping in the up/down direction with the pressure chambers 26 bend or flex to project to the side of the pressure chambers 26 and, the flexure degree becomes larger than that of the time when no potential difference arises between the first electrodes 32 and the second electrodes 34. Further, in this embodiment, because the thickness t2 of the piezoelectric layer 33 is as thin as about 1.0 μm, a large electrical field arises in the piezoelectric layer 33 to render a high degree of flexure of the vibration plate 30 and the piezoelectric layer 33.

When the inks are discharged from a certain nozzle 24, the driver IC 51 once switches the potential of the second electrode 34 of the piezoelectric element 31 corresponding to that nozzle 24 to the ground potential, and then returns the same to the drive potential. If the potential of the second electrode 34 is switched to the ground potential, then the flexure degree of the vibration plate 30 and the piezoelectric layer 33 decreases. Thereafter, if the potential of the second electrode 34 returns to the drive potential, then the flexure degree of the vibration plate 30 and the piezoelectric layer 33 increases to reduce the volume of the pressure chamber 26. As a result, the pressure of the ink in the pressure chamber 26 increases such that the ink is discharged from the nozzle 24 in communication with the pressure chamber 26.

Further, in this embodiment, when the printer 1 carries out recording on the recording paper 100, the drivers IC 51 drive at a high frequency. That is, the drivers IC 51 drive the piezoelectric elements 31 at the drive frequency of 50 kHz or higher.

Relationship Between the Length L of the Pressure Chambers 26 and the Diameter D of the Nozzle Holes 24*a*

Next, an explanation will be given on the relation between the length L of the pressure chambers 26 and the diameter D of the nozzle holes 24*a*. In this embodiment, the length L of the pressure chambers 26 and the diameter D of the nozzle holes 24*a* satisfy the condition $35 \leq L/D \leq 50$. Hereinbelow, this relation will be explained in detail.

When liquid droplets (ink droplets) are discharged from the nozzles 24, some foregoing liquid droplets are formed due to the profile of a pressure wave in the vicinity of the nozzles 24 with respect to time. Therefore, a simulation was made to evaluate the ratios of the foregoing liquid droplet amount to various design parameters. In more detail, such a case is assumed that the plurality of nozzles 24 in the nozzle arrays 28 are arrayed at the arrayal pitch P for the density of 300 dpi, with the thickness t2 of the piezoelectric layer 33=1.0 μm, the thickness t1 of the vibration plate=1.4 μm, the width W of the pressure chambers 26=65 μm. Then, the ratios of the foregoing liquid droplet amount were evaluated for the ink jet head by applying various changes to the length L of the pressure chambers 26 and the diameter D of the nozzle holes 24*a*.

Figure 7:
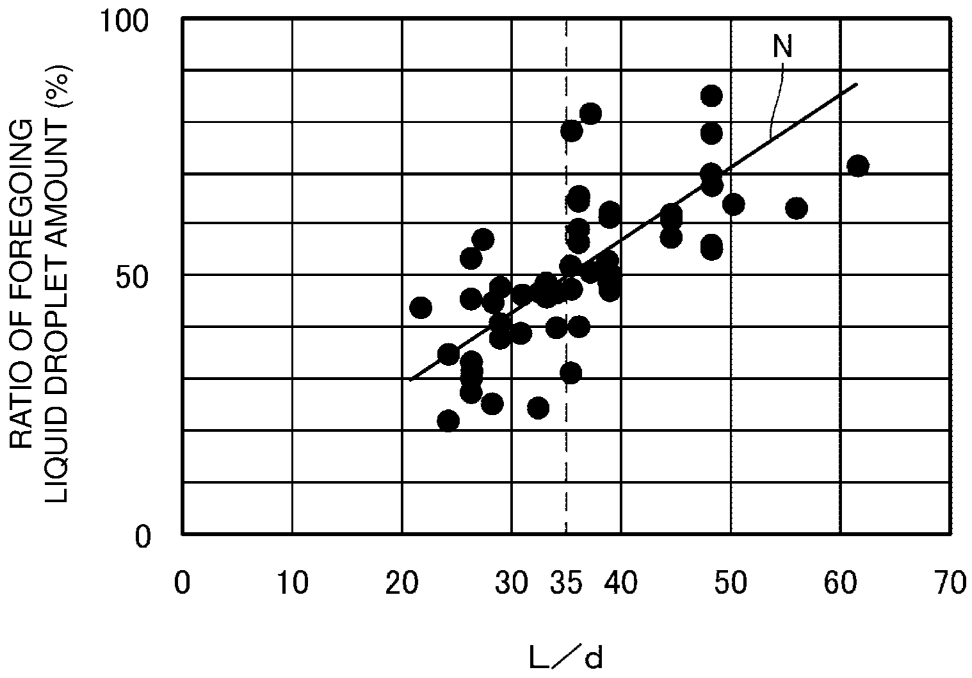
FIG. 7 depicts a relation between a ratio of liquid droplet amount of foregoing liquid droplets to total liquid droplet amount discharged from nozzles, and a value obtained by dividing a length of pressure chambers by the diameter of nozzle holes.
Figure 8:
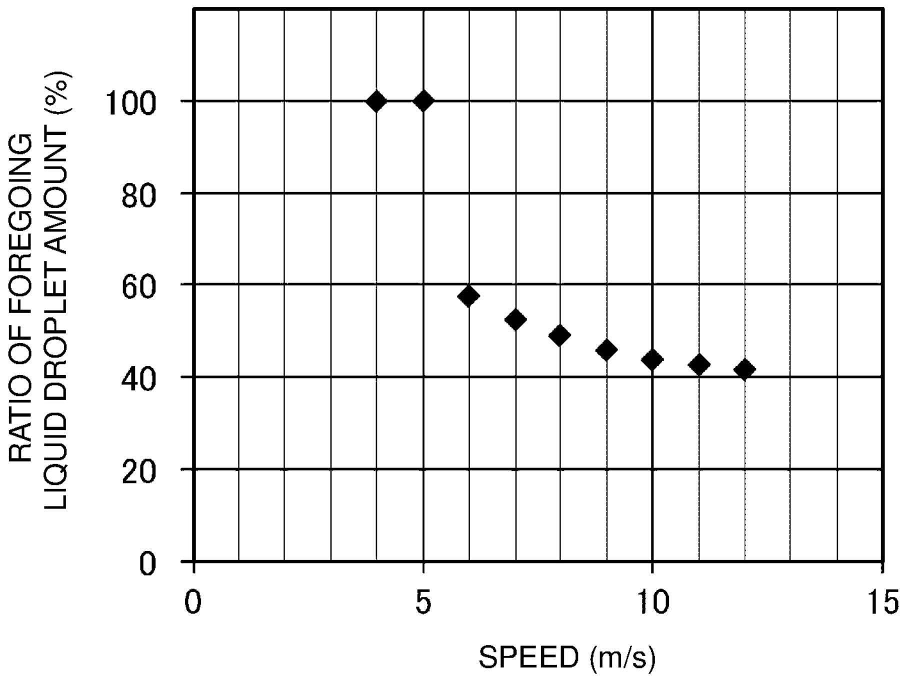
FIG. 8 depicts a relation between the ratio of liquid droplet amount of the foregoing liquid droplets to the total liquid droplet amount discharged from the nozzles, and discharging speed of the liquid droplets from the nozzles.

The vertical axis of FIG. 7 depicts the ratio of the foregoing liquid droplet amount to the total liquid droplet amount discharged from the nozzles 24, whereas the horizontal axis is the value of dividing the length L of the pressure chambers 26 by the diameter D of the nozzle holes 24*a*. The total liquid droplet amount discharged from the nozzles 24 mentioned here is the liquid droplet amount discharged from the nozzles 24 through one printing period.

Note that one printing period is the time needed for the recording paper 100 and the ink jet head 4 to move relatively through a unit distance corresponding to the resolution of printing in the scanning direction. FIG. 7 plots the relation between the ratio of the foregoing liquid droplet amount and L/D on the basis of the evaluated result. Then, based on the result of FIG. 7, by the least-square method, as the relation between the ratio of the foregoing liquid droplet amount and L/D, the following relational expression (a) was calculated (the expression of the straight line N of FIG. 7). Note that the relational expression (a) stands with the value on the vertical axis as y and the value on the horizontal axis as x in FIG. 7:

$$y=0.0142x \tag{a}$$

From FIG. 7, it is understood that there is a correlation between the L/D and the ratio of the foregoing liquid droplet amount. If the L/D is lower than 35, then the ratio of the foregoing liquid droplet amount is lower than 50%, whereas if the L/D is 35, then the ratio of the foregoing liquid droplet amount is 50% or higher. That is, if the L/D is 35 or higher, then following the foregoing liquid droplets discharged earlier in the total liquid droplets discharged from the nozzles 24, the succeeding liquid droplets discharged has the ratio of the liquid droplet amount being lower than 50%, whereas the ratio of the foregoing liquid droplet amount becomes as high as 50% or more. Therefore, the landing positions of the foregoing liquid droplets are less likely to be disordered. Further, for example, as disclosed in Japanese Patent Application Laid-open No. 2007-190901, by carrying out a publicly known discharging control to apply a stabilizing pulse after the main pulse for discharging the foregoing liquid droplets, it is possible to suppress discharging the succeeding liquid droplets discharged following the foregoing liquid droplets (the liquid droplets discharged due to the main pulse). That is, it is possible to discharge the foregoing liquid droplets only. On this occasion, from the nozzle holes 24*a*, only the foregoing liquid droplets are discharged and no succeeding liquid droplets lower than 50% are discharged, such that the image quality is further improved.

If the L/D exceeds 50, then the ratio of the foregoing liquid droplet amount becomes 70% or higher. Thus, in order to downsize the ink jet head 4 per se, if the length L of the pressure chambers 26 is shortened, then the diameter D of the nozzle holes 24*a* is lessened. For example, if the length L of the pressure chambers 26 is set to 500 μm, then the diameter D of the nozzle holes 24*a* is less than 10 μm, thereby greatly reducing the liquid droplet amount dischargeable from the nozzle holes 24*a*. In this manner, if the liquid droplet amount of inks decreases greatly, then because the ink jet head 4 per se becomes very light, the landing positions of the ink droplets on the recording paper 100 are more likely to be disordered by the influence of conveyance air flow generated by conveying the recording paper 100 in printing. Therefore, if the L/D is set to 50 or lower, then by ranging the L/D not less than 35 and not more than 50 as described above, it is possible to secure the ratio of the foregoing liquid droplet amount at 50% or higher, thereby allowing for suppressing the disorder of the landing positions of the foregoing liquid droplets.

The length L of the pressure chambers 26 in this embodiment is preferably 900 μm or shorter. If the length L of the pressure chambers 26 exceeds 900 μm, then in the scanning direction, the length of the channel member 21 increases, thereby upsizing the ink jet head 4. Therefore, if the length L is 900 μm or shorter, then it is possible to downsize the entire ink jet head 4 with the smaller pressure chambers 26.

The diameter D of the nozzle holes 24*a* of the nozzles 24 in this embodiment is preferably 12 μm or longer. If the diameter D of the nozzle holes 24*a* is too short such as shorter than 12 μm, then the liquid droplet amount of ink droplets discharged from the nozzles 24 is reduced greatly. In this manner, if the liquid droplet amount of inks decreases greatly, then because the ink jet head 4 per se becomes very light, the landing positions of the ink droplets on the recording paper 100 are more likely to be disordered by the influence of conveyance air flow generated by conveying the recording paper 100 in printing. On the other hand, if the diameter D of the nozzle holes 24*a* is 12 μm or longer, then it is possible to secure a desired liquid droplet amount of ink droplets discharged from the nozzles 24, while the ink droplets discharged are less likely to be affected by the conveyance air flow, thereby improving the precision of the landing positions on the recording paper 100.

The maximum value of the length L of the pressure chambers 26 is 600 μm with the diameter D of the nozzle holes 24*a* being 12 μm. By virtue of this, the length L of the pressure chambers 26 is more preferably 600 μm or shorter. Therefore, because the precision of the landing positions is raised while the length L of the pressure chambers 26 is reduced, it is possible to let the diameter D of the nozzle holes 24*a* be 12 μm. Then, it is possible to further downsize the entire ink jet head 4 with the smaller pressure chambers 26.

The minimum value of the length L of the pressure chambers 26 is 420 μm with the diameter D of the nozzle holes 24*a* being 12 μm. By virtue of this, the length L of the pressure chambers 26 is more preferably 420 μm or longer. Therefore, the precision of the landing positions can be raised while the length L of the pressure chambers 26 is reduced.

As described above, according to the ink jet head 4 of this embodiment, such a condition is satisfied that the length L of the pressure chambers 26 and the diameter D of the nozzle holes 24*a* are 35≤L/D≤50. By virtue of this, when the ink droplets are discharged from the nozzle holes 24*a*, the ratio of the foregoing liquid droplet amount increases to 50% or higher for the droplets discharged earlier. Therefore, the landing positions of the foregoing liquid droplets are less likely to be disordered.

Further, the thickness t2 of the piezoelectric layer 33 in this embodiment is as thin as about 1.0 μm, being not more than 1.5 μm. In this manner, if the thickness t2 of the piezoelectric layer 33 is thin, then the piezoelectric elements 31 have a high efficiency in deformation when driven. Therefore, it is possible to downsize the entire ink jet head 4 with the smaller pressure chambers 26.

Further, the channel unit includes a silicon substrate formed with the pressure chambers 26. In this manner, because the channel unit has the silicon substrate, it is possible to form narrow channels (including the pressure chambers 26) by using semiconductor processing. As a result, it is possible to further downsize the ink jet head 4.

Further, because the width W is less than the length L with respect to the pressure chambers 26, it is possible to arrange the plurality of pressure chambers 26 in the conveyance direction at a density as high as 300 dpi or higher. That is, in the conveyance direction, it is possible to align a large number of pressure chambers 26 per unit area. Therefore, it is possible to further downsize the ink jet head 4.

Hereinabove, a preferred embodiment of the present teaching was explained. However, the present teaching is not limited to the above embodiment but can undergo various changes without departing from the scope of the appended claims.

If the aforementioned L/D is not less than 35 and not more than 50, then the length L of the pressure chambers 26 and the diameter D of the nozzle holes 24*a* may be as large as desired. That is, the length L of the pressure chambers 26 may exceed 900 μm or be less than 420 μm. Further, the diameter D of the nozzle holes 24*a* may be less than 12 μm. Further, the thickness t2 of the piezoelectric layer 33 may exceed 1.5 μm or be less than 1.0 μm. Further, the piezoelectric layer 33 may be constructed of two or more layers.

Further, in the above embodiment, the channel member 21 is formed of a silicon substrate. However, without being limited to that, the channel member 21 may be formed of another material such as a synthetic resin material, a metallic material, or the like.

Further, the ink channels in the ink jet head 4 may have a different structure from those of the above embodiment, such as including the nozzles and the pressure chambers in communication with the nozzles. Further, the inks flow into the inflow areas 26*a* of the pressure chambers 26 from the ink supply holes 30*a* formed in the vibration plate 30 via the throttle channels 23*c*. However, the structure for the inks to flow into the pressure chambers 26 is not limited to any specific one.

Figure 9:
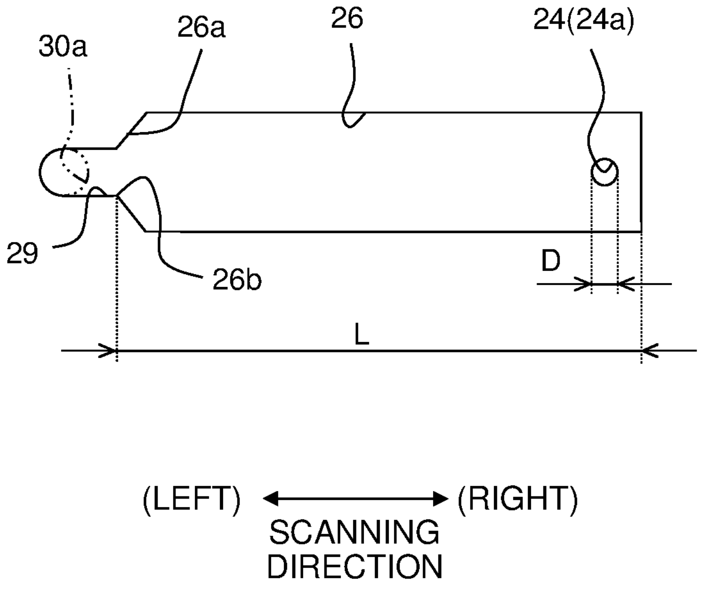
FIG. 9 is a plan view depicting a modified embodiment of the present teaching for the pressure chambers.

That is, as depicted in FIG. 9, the pressure chamber 26 may connect with a communication channel 29 via a communication hole 26*b* formed in the inner wall at the other side in the scanning direction (at the end opposite to the nozzle 24). The communication channel 29 in this modified embodiment is arranged to align with the pressure chamber 26 in the scanning direction, and its width is narrower than the width W of the pressure chamber 26 to function as a throttle channel Further, the communication channel 29 is in communication with the ink supply hole 30*a* where the ink flows into the pressure chamber 26 from the communication channel 29. Note that the ink may be supplied to the communication channel 29 by another method without being limited to the supply from the ink supply hole 30*a*. Further, in this modified embodiment, the inner wall of the pressure chamber 26 at the other side is inclined such that the closer to the communication channel 29 (the communication hole 26*b*), the narrower the width, where the inflow area 26*a* is formed in that inclined part of the pressure chamber 26. The length L of the pressure chamber 26 in this modified embodiment extends in the scanning direction from the communication hole 26*b* to the inner wall of one end of the pressure chamber 26 (the end on the side of the nozzle 24). In this modified embodiment, it is also possible to obtain the same effects with the same configuration as in the aforementioned embodiment. Note that the inclined part of the inner wall defining the inflow area 26*a* may be formed parallel to the scanning direction, without being limited to any specific one.

Further, a different ink supply hole replacing the ink supply hole 30*a* may be formed in such a position as if to interpose the pressure chamber 26 with the ink supply hole 30*a* in the up/down direction, such that the ink may flow into the pressure chamber 26 from that ink supply hole. In this case, the area where the ink flows from the ink supply hole to the pressure chamber 26 becomes the inflow area, and the length L of the pressure chamber 26 refers to that in the direction (the scanning direction; the second direction) from that inflow area to the nozzle, being orthogonal to the up/down direction (the first direction).

Further, in the above embodiment, the drive frequency for the piezoelectric element 31 was, in particular, 50 kHz or higher. However, without being limited to that, the drive frequency for the piezoelectric element 31 may be lower than 50 kHz.

Further, in the above embodiment, the width W of the pressure chambers 26 was 80 μm or less (the length in the conveyance direction). However, without being limited to that, the width W of the pressure chambers 26 may be longer than 80 μm.

Further, the shape of the pressure chambers 26 is not limited to a rectangle with the scanning direction as its longitudinal direction, either. The shape of the pressure chambers 26 may be other than a rectangle with the scanning direction as its longitudinal direction, or be shaped with the conveyance direction as its longitudinal direction, or be shaped with its length in the scanning direction being the same as its length in the conveyance direction.

Further, in the above explanation, an example was used to apply the present teaching to an ink jet head discharging ink from nozzles. However, without being limited to that, it is also possible to apply the present teaching to liquid droplet discharging heads other than ink jet heads, configured to discharge a liquid other than ink from nozzles.

What is claimed is:

1. A liquid droplet discharging head comprising:

a channel unit having a plurality of nozzles arranged in an end thereof on one side in a first direction, and a plurality of pressure chambers arranged in another end thereof on the other side in the first direction and communicating with the nozzles respectively; and a piezoelectric element having a vibration plate arranged on a surface of the channel unit on the other side in the first direction to cover the pressure chambers, and a piezoelectric layer arranged on a surface of the vibration plate on the other side in the first direction, wherein each of the pressure chambers has a length L in a second direction longer than a length in a third direction, the second direction being orthogonal to the first direction and being a direction from an inflow area where liquid flows into one of the pressure chambers to one of the nozzles communicating with the pressure chamber, the third direction being orthogonal to both the first direction and the second direction, wherein in the channel unit, the nozzles form a nozzle array along the third direction, the nozzles being aligned at a density of 300 dpi or higher in the third direction in the nozzle array, and the pressure chambers form a pressure chamber array along the third direction, the pressure chambers being aligned at the density of 300 dpi or higher in the third direction in the pressure chamber array, wherein each of the nozzles has a nozzle hole opening in the surface of the channel unit on the one side, wherein the length L of each of the pressure chambers and a diameter D of the nozzle hole satisfy $35 \leq L/D \leq 50$, and wherein a ratio between a foregoing liquid droplet amount to a total liquid droplet amount for each of the nozzles is 50% or greater.

2. The liquid droplet discharging head according to claim 1, wherein a length of the piezoelectric layer in the first direction is equal to or less than 1.5 μm.

3. The liquid droplet discharging head according to claim 1, wherein the diameter D of the nozzle hole is equal to or less than 12 μm.

4. The liquid droplet discharging head according to claim 1, wherein the length L of each of the pressure chambers is equal to or less than 900 μm.

5. The liquid droplet discharging head according to claim 4, wherein the length L of each of the pressure chambers is equal to or less than 600 μm.

6. The liquid droplet discharging head according to claim 4, wherein the length L of each of the pressure chambers is equal to or more than 420 μm.

7. The liquid droplet discharging head according to claim 1, wherein the channel unit includes a silicon substrate in which the pressure chambers are formed.

* * * * *